United States Patent Office 3,232,945
Patented Feb. 1, 1966

3,232,945
7,8,9,10-TETRAHALO-6H-CYCLOHEPTA-(b)-QUINOLINES
Max V. Sigal, Jr., Indianapolis, Ind., and Bernard J. Brent and Paolo Marchini, Bristol, Tenn., assignors to The S. E. Massengill Company, Bristol, Tenn.
No Drawing. Filed Aug. 13, 1962, Ser. No. 216,342
10 Claims. (Cl. 260—288)

The present invention relates to new acridine derivatives, and more particularly to aminoacridine derivatives with an unusually high degree of activity which makes the same suitable for use as antidepressants, and the like.

It is a primary object of the present invention to provide a new series of acridine derivatives.

It is another object of the present invention to provide for methods of producing the new acridine derivatives of the present invention and for methods of using the same as antidepressants.

It is another object of the present invention to provide new 1,2,3,4-tetrahydroacridine derivatives which have antidepressant activity and other important properties.

It is yet another object of the present invention to provide new 7,8,9,10-tetrahydro-6H-cyclohepta-(b)-qinoline derivatives which also have excellent antidepressant activity.

It is a further object of the present invention to provide new acridine derivatives all of which are highly active as central stimulants through central cholinergic and/or monoaminooxidase inhibiting properties, and many of which compounds exhibit analgesic, sedative, and ataractic activity.

Other objects and advantages of the present invention will be apparent from a further reading of the specification and of the appended claims.

With the above and other objects in view, the present invention mainly comprises a compound selected from the group consisting of compounds of the following general formula:

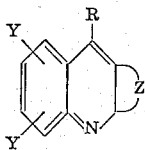

wherein R is selected from the group consisting of:

(1) Chlorine (2) Hydroxy, with the H linked to the N-atom and R being =O (3) Amino (4) Substituted phenoxy (5) 3-dimethylaminopropylamine

—NHCH$_2$CH$_2$CH$_2$—N—(CH$_3$)$_2$ (6) (4-(2-hydroxyethyl) piperazinyl) propylamino

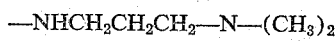

(7) (1-methyl-3-piperidyl) methylamino-NHCH$_2$—

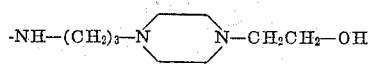

(8) 3-(4-carbamoylpiperidine) propylamine

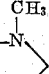

(9) 3-(1-methyl-4-piperazinyl) propylamine

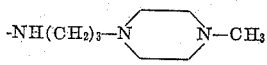

(10) 3-(4-(acetoxyethyl)-piperazinyl) propylamine

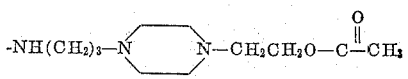

(11) 2-(N-methyl-2-piperidy) ethylamino-NHCH$_2$CH$_2$—

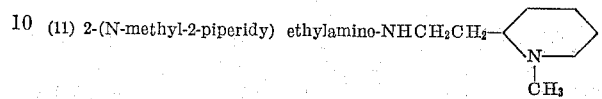

(12) 3-dimethylamino-2-methylpropylamino $$-\text{NHCH}_2\overset{\text{CH}_3}{\underset{|}{\text{CH}}}\text{CH}_2-\text{N}-(\text{CH}_3)_2$$

(13) Dimethylaminopropylmercapto

—S—(CH$_2$)$_3$—N—(CH$_3$)$_2$

(14) Dimethylaminopropoxy

—O—(CH$_2$)$_3$—N—(CH$_3$)$_2$

(15) Methylmercapto —S—CH$_3$

(16) Mercapto —SH

(17) Dimethylaminoethoxy —O—(CH$_2$)$_2$—N—(CH$_3$)$_2$;

wherein Y is selected from the group consisting of hydrogen, chlorine, lower alkyl and methoxy; wherein Z together with the two carbon atoms to which it is attached is selected from the group consisting of cyclohexane, methyl-substituted cyclohexane, trifluoromethyl-substituted cyclohexane, methoxy-substituted cyclohexane, methylmercapto-substituted cyclohexane (Z not being unsubstituted when Y is hydrogen), and cycloheptane; and non-toxic acid addition salts thereof.

When Z is unsubstituted or substituted cyclohexane, then the compounds of the present invention are of the following formula:

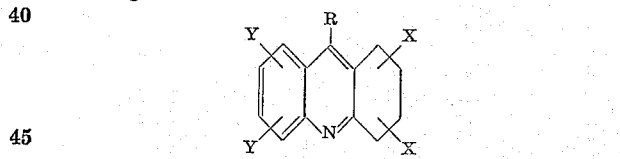

wherein R and Y have the same definitions as above and wherein X is selected from the group consisting of hydrogen, methyl, trifluoromethyl, methoxy and methylmercapto.

When Z is cycloheptane then the compounds of the present invention are of the following general formula:

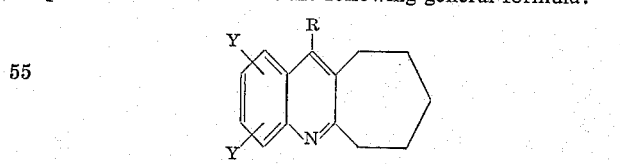

wherein R and Y have the same definitions as above.

The compounds of the present invention can be produced by condensing the substituted aniline with the chosen 2-carbethoxycyclohexanone, or the substituted 2-carbethoxycyclohexanone, or the 2-carbethoxycycloheptanone, as the case may be and subsequent cyclization. Where 2-carbethoxycyclohexanone or a substituted 2-carbethoxycyclohexanone is used then the subsequent cyclization results in the production of the corresponding tetrahydroacridone. Where 2-carbethoxycycloheptanone was used to start then the subsequent cyclization results in the production of the 7,8,9,10-tetrahydro-6H-cyclohepta-(b)-quinoline-11-one.

Replacement of the hydroxyl in R position is accomplished in the usual manner with $POCl_3$.

In the case of the cyclohexanone compounds the treatment of the 9-chloro compounds with ammonia in boiling cresol results in the production of the corresponding amines. In certain instances, particularly with the 7-substituted 9-chloroacridines the 9-cresoxy derivatives is first isolated.

In the case of the cycloheptanone compounds treatment of the 11-chloro compounds with ammonia in boiling cresol results in the production of the corresponding amine. In certain cases, particularly with the 2-substituted 11-chloro compounds, the 11-cresoxy derivative is first isolated.

As indicated above, the compounds of the present invention possess unusual central "stimulant" activity through central cholinergic or monoamino oxidase inhibiting properties. In addition some of the compounds exhibit analgesic, sedative, ataractic and/or anticholinergic activity.

The following examples are given to further illustrate the present invention. The scope of the invention is not, however, meant to be limited to the specific details of the examples.

EXAMPLE 1

5-methyl-1,2,3,4-tetrahydro-9-acridine

To a mixture of 2-carbethoxycyclohexanone (30 g.) and o-toluidine (19.5 g.), benzene (250 ml.) and conc. HCl (4 drops) was added. The solution was refluxed with a water-separator until the calculated amount of water was collected. The solvent was removed in vacuo leaving a viscous oil (48 g.) which without further purification was added dropwise to stirred mineral oil at 280° C. This temperature was maintained for thirty minutes after addition was complete and, after cooling, the solid was recovered by filtration. The crude 5-methyl-1,2,3,4-tetrahydroacridine was crystallized from absolute ethyl alcohol to yield 34 g. (M.P. 334°–335° C.).

Calc. for $C_{14}H_{15}NO$: C, 78.84; H, 7.09. Found: C, 78.09; H, 6.91.

EXAMPLE 2

5-methyl-9-chloro-1,2,3,4-tetrahydroacridine 5-methyl-1,2,3,4-tetrahydro-9-acridone (30 g.) was added, with swirling, to $POCl_3$ (50 ml.) and the mixture refluxed for one hour. After cooling to room temperature the mixture was triturated with crushed ice (400 ml.) and again allowed to come to room temperature. After treating with charcoal and alkalinizing to pH 9.5 with conc. $NH_4OH$ the precipitated solid was collected on a filter, extracted with acetone (200 ml. x 3), filtered (hot), and upon cooling yellow crystals were obtained. Wt. 16.5 g. (M.P. 46°–47° C.).

Calc. for $C_{14}H_{14}ClN$; C, 72.56; H, 6.09; Cl, 15.31; N, 6.05. Found: C, 72.36; H, 6.13; Cl, 14.96; N, 6.37.

EXAMPLE 3

7-chloro-9-p-cresoxy-1,2,3,4-tetrahydroacridine 7,9-dichloro-1,2,3,4-tetrahydroacridine (5 g.) was dissolved in p-cresol (50 ml.) and anhydrous $NH_3$ passed through the solution at reflux temperature for four hours. Upon cooling the mixture was diluted with 100 ml. ether and washed with 2% HCl (35 ml. x 3) and the ether-cresol solution concentrated to about 20 ml. leaving a viscous oil which upon the addition of 100 ml. ether produced brown crystals (2 g.). Recrystallization from absolute alcohol gave 1.4 g. of material melting at 143°–144° C.

Theory: C, 74.18; H, 5.60; Cl, 10.95; H, 4.32. Found: C, 74.26; H, 5.77; Cl, 11.24; N, 4.14.

EXAMPLE 4

7-chloro-9-amino-1,2,3,4-tetrahydroacridine

In another instance, upon the addition of ether, as described above (Example 3), to the reaction mixture a solid precipitated which was insoluble in the 2% HCl solution. This solid was dissolved in 50% ethanol and made basic with 50% NaOH. An amorphous material was obtained which after crystallization from absolute ethyl alcohol gave the pure 7-chloro-9-amino-1,2,3,4-tetrahydroacridine (2 g.) M.P. 260° C.

Analysis.—Calc. for $C_{13}H_{13}ClN_2$: C, 67.10; H, 5.63; N, 12.04. Found: C, 67.16; H, 5.33; N, 12.01.

EXAMPLE 5

9-amino-5-chloro-1,2,3,4-tetrahydroacridine 7,9-dichloro-1,2,3,4-tetrahydroacridine (5 g.) was dissolved in p-cresol (50 ml.) and anhydrous $NH_3$ passed through the solution at reflux temperature for four hours. After cooling the mixture was diluted with 200 ml. ether and extracted with 2% HCl (50 ml. x 3). The acid extracts were combined and made basic with 50% NaOH giving an amorphous material. Crystallization from absolute ethyl alcohol gave the pure 9-amino-5-chloro-1,2,3,4-tetrahydroacridine (2 g.) M.P. 189°–190° C.

Calc. $C_{13}H_{13}ClN_2$: C, 67.10; H, 5.63; N, 12.01. Found: C, 67.11; H, 5.24; N, 11.82.

Following the procedures of Examples 1–5, the following compounds of Examples 6–37 were prepared:

EXAMPLE 6

$C_{14}H_{15}NO_2$; 7-methoxy-1,2,3,4-tetrahydroacridone

M.P.: 360°
Theory: C, 66.81; H, 5.18
Found: C, 65.89; H, 5.22

EXAMPLE 7

$C_{14}H_{15}NO$; 2-methyl-1,2,3,4-tetrahydroacridone

M.P.: 352°–353°
Theory: C, 78.84; H, 7.09
Found: C, 77.82; H, 7.23

EXAMPLE 8

$C_{14}H_{15}NO$; 5-methyl-1,2,3,4-tetrahydroacridone

M.P.: 334°–335°
Theory: C, 78.84; H, 7.09
Found: C, 78.09; H, 6.91

EXAMPLE 9

$C_{14}H_{15}NO$; 7-methyl-1,2,3,4-tetrahydroacridone

M.P.: 357°
Theory: C, 78.84; H, 7.09; N, 6.57
Found: C, 79.13; H, 6.88; N, 6.59

EXAMPLE 10

$C_{15}H_{17}NO$: 5,8-dimethyl-1,2,3,4-tetrahydroacridone

M.P.: 242°–243°
Theory: C, 79.26; H, 7.54; N, 6.16
Found: C, 79.77; H, 7.29; N, 6.06

EXAMPLE 11

$C_{15}H_{17}NO$; 5-ethyl-1,2,3,4-tetrahydroacridone

M.P.: 298°–299°
Theory: C, 79.26; H, 7.54
Found: C, 79.22; H, 7.48

EXAMPLE 12

$C_{15}H_{17}NO$; 6,8-dimethyl-1,2,3,4-tetrahydroacridone

M.P.: 320°–322°
Theory: C, 79.26; H, 7.54; N, 6.16
Found: C, 79.23; H, 7.16; N, 6.21

EXAMPLE 13

$C_{14}H_{14}ClN$; 9-chloro-2-methyl-1,2,3,4-tetrahydroacridine

M.P.: 63°–64°
Theory: C, 72.56; H, 6.09; Cl, 15.31; N, 6.05
Found: C, 72.75; H, 6.20; Cl, 15.09; N, 6.22

EXAMPLE 14

$C_{14}H_{14}ClN$; *9-chloro-4-methyl-1,2,3,4-tetrahydroacridine*
M.P.: 55°–56°
Theory: C, 72.56; H, 6.09; Cl, 15.31; N, 6.05
Found: C, 72.41; H, 5.95; Cl, 15.37; N, 6.17

EXAMPLE 15

$C_{14}H_{14}ClN$; *9-chloro-7-methyl-1,2,3,4-tetrahydroacridine*
M.P.: 85°
Theory: C, 72.56; H, 6.09; Cl, 15.31; N, 6.05
Found: C, 72.31; H, 5.98; Cl, 15.35; N, 6.12

EXAMPLE 16

$C_{15}H_{16}ClN$; *9-chloro-5,8-dimethyl-1,2,3,4-tetrahydroacridine*
M.P.: 67°–70°
Theory: C, 73.01; H, 6.95; Cl, 14.37
Found: C, 72.76; H, 6.80; Cl, 14.38

EXAMPLE 17

$C_{15}H_{16}ClN$; *9-chloro-6,8-dimethyl-1,2,3,4-tetrahydroacridine*
M.P.: 89°–90°
Theory: C, 73.01; H, 6.95; Cl, 14.37; N, 5.68
Found: C, 73.21; H, 6.90; Cl, 14.34; N, 5.74

EXAMPLE 18

$C_{21}H_{21}NO_2$; *7-methoxy-9-(4'-methyl-phenoxy)-1,2,3,4-tetrahydroacridine*
M.P.: 147°–149°
Theory: C, 78.97; H, 6.63; N, 4.39
Found: C, 78.15; H, 7.08; N, 4.63

EXAMPLE 19

$C_{20}H_{18}ClNO$; *7-chloro-9-(4'-methyl-phenoxy)-1,2,3,4-tetrahydroacridine*
M.P.: 143°–145°
Theory: C, 74.18; H, 5.60; Cl, 10.95; N, 4.32
Found: C, 74.26; H, 5.77; Cl, 11.24; N, 4.14

EXAMPLE 20

$C_{14}H_{16}N_2$; *9-amino-2-methyl-1,2,3,4-tetrahydroacridine*
M.P.: 202°–205°
Theory: C, 79.20; H, 7.60; N, 13.20
Found: C, 79.92; N, 12.86

EXAMPLE 21

$C_{14}H_{16}N_2$; *9-amino-5-methyl-1,2,3,4-tetrahydroacridine*
M.P.: 142°–144°
Theory: C, 79.20; H, 7.60; N, 13.20
Found: C, 78.40; H, 6.73; N, 13.54

EXAMPLE 22

$C_{14}H_{16}N_2$; *9-amino-7-methyl-1,2,3,4-tetrahydroacridine*
M.P.: 222°–224°
Theory: C, 79.20; H, 7.60; N, 13.20
Found: C, 79.28; H, 7.30; N, 13.28

EXAMPLE 23

$C_{14}H_{16}N_2O$; *9-amino-7-methoxy-1,2,3,4-tetrahydroacridine*
M.P.: 212°–213°
Theory: C, 73.65; H, 7.07; N, 12.27
Found: C, 74.79; H, 6.78; N, 12.69

EXAMPLE 24

$C_{15}H_{18}N_2$; *9-amino-5-ethyl-1,2,3,4-tetrahydroacridine*
M.P.: 120°–122°
Theory: C, 79.61; H, 8.01; N, 12.38
Found: C, 79.48; H, 8.08; N, 12.21

EXAMPLE 25

$C_{14}H_{16}N_2O$; *9-amino-5-methoxy-1,2,3,4-tetrahydroacridine*
M.P.: 232°–234°
Theory: C, 73.65; H, 7.06; N, 12.27
Found: C, 73.93; H, 7.12; N, 12.00

EXAMPLE 26

$C_{14}H_{16}N_2$; *9-amino-4-methyl-1,2,3,4-tetrahydroacridine*
M.P.: 142°–144°
Theory: C, 79.20; H, 7.60; N, 13.20
Found: C, 79.19; H, 7.68; N, 13.54

EXAMPLE 27

$C_{13}H_{13}ClN_2$; *9-amino-6-chloro-1,2,3,4-tetrahydroacridine*
M.P.: 273°–275°
Theory: C, 67.10; H, 5.63; Cl, 15.23; N, 12.04
Found: C, 66.86.; H, 6.31; Cl, 15.96; N, 12.19

EXAMPLE 28

*4 - methoxy - 7,8,9,10 - tetrahydro - 6H - cyclohepta-(b)-quinoline-11-one*

To a mixture of 2-carbethoxycycloheptanone (25 g.) and o-anisidine (16.5 g.), benzene (95 ml.) and conc. HCl (4 drops) was added. The solution was refluxed with a water separator until the calculated amount of water was collected. The solvent was removed in vacuo leaving a viscous oil (35 g.) which, without further purification, was added dropwise to stirred mineral oil at 280° C. The mixture was allowed to cool and the solid recovered by filtration. The crude 4-methoxy-7,8,9,10-tetrahydro-6H-cyclohepta-(b)-quinoline-11-one crystallized from dimethylformamide to yield 9 g. (M.P. 282°–284° C.).

Calcd. $C_{15}H_{17}NO_2$: C, 74.05; H, 7.04; N, 5.76. Found: C, 73.94; H, 7.02; N, 5.96.

EXAMPLE 29

*11 - chloro - 4 - methoxy - 7,8,9,10 - tetrahydro - 6H-cyclohepta-(b)-quinoline*

4 - methoxy - 7,8,9,10 - tetrahydro - 6H - cyclohepta-(b)-quinoline-11-one (8 g.) was added, with swirling, to $POCl_3$ (11 ml.) and refluxed for one hour. After cooling to room temperature the mixture was triturated with crushed ice (100 g.) and again allowed to come to room temperature. After treating with charcoal and alkalinizing to pH 9.5 with conc. $NH_4OH$ the precipitated solid was collected on a filter, extracted with acetone, filtered (hot), and upon cooling 11-chloro-4-methoxy-7,8,9,10-tetrahydro-6H-cyclohepta-(b)-quinoline was obtained. Crystallization from acetone yielded 6.5 g. (M.P. 133°–134° C.).

Calc. $C_{15}H_{16}ClNO$: C, 68.83; H, 6.16; Cl, 13.54. Found: C, 68.21; H, 5.96; Cl, 13.37.

EXAMPLE 30

*2-methoxy-11-(4'-methylphenoxy)-7,8,9,10-tetrahydro-6H-cyclohepta-(b)-quinoline*

11-chloro-2-methoxy-7,8,9,10 - tetrahydro-6H-cyclohepta-(b) quinoline (5 g.) was dissolved in p-cresol (50 ml.) and anhydrous $NH_3$ passed through the solution at reflux temperature for four hours. Upon cooling the mixture was diluted with 100 ml. ether and washed with 2% HCl (35 ml. x 3) and the ether-cresol solution concentrated to about 20 ml. leaving a viscous oil which upon the addition of 100 ml. ether produced brown crystals (4.3 g.). Crystallization from 80% ethyl alcohol gave the pure 2-methoxy-11-(4'-methylphenoxy)-7,8,9,10-tetrahydro-6H-cyclohepta-(b)-quinoline-hydrochloride (3 g.) M.P. 180°–184° C.

Calc. $C_{22}H_{23}NO_2 \cdot HCl$: C, 71.43; H, 6.49; N, 3.79. Found: C, 72.35; H, 6.10; N, 3.43.

EXAMPLE 31

*2-methoxy-11-amino-7,8,9,10-tetrahydro-6H-cyclohepta-(b)-quinoline*

In another instance, upon the addition of ether, as described above (Example 4), to the reaction mixture a solid precipitated which was insoluble in the 2% HCl solution. This solid was dissolved in 50% ethanol and made basic with 50% NaOH. An amorphous material was obtained which after crystallization from petroleum ether gave the pure 2-methoxy-11-amino-7,8,9,10-tetrahydro-6H-cyclohepta-(b)-quinoline (0.7 g.) M.P. 178°–179° C.

Calc. $C_{15}H_{18}N_2O$; C, 74.35; H. 7.49; N, 11.56. Found: C, 73.90; H, 7.29; N, 11.06.

EXAMPLE 32

*11-amino-2-methyl-7,8,9,10-tetrahydro-6H-cyclohepta-(b)-quinoline*

11-chloro-2-methyl-7,8,9,10-tetrahydro - 6H - cyclohepta-(b)-quinoline (5 g.) was dissolved in p-cresol (50 ml.) and anhydrous $NH_3$ passed through the solution at reflux temperature for four hours. After cooling the mixture was diluted with 200 ml. ether. A solid precipitated which was insoluble to 2% HCl washings (50 ml. x 3). This solid was collected, dissolved in 50% ethyl alcohol and made basic with 50% NaOH. An amorphous material was obtained which after crystallization from ethyl acetate gave 3 g. of material melting at 209°–210° C.

Following the procedures of Examples 28–32, the compounds of the following Examples 33–58 were prepared:

EXAMPLE 33

$C_{14}H_{14}ClNO$; *3-chloro-7,8,9,10-tetrahydro-6H-cyclohepta-(b)-quinoline-11-one*

M.P.: 360°
Theory: C, 67.88; H, 5.70; Cl, 14.31; N, 5.66
Found: C, 67.81; H, 5.78; Cl, 14.19; N, 5.72

EXAMPLE 34

$C_{16}H_{19}NO$; *1,4-dimethyl-7,8,9,10-tetrahydro-6H-cyclohepta-(b)-quinoline-11-one*

M.P.: 238°–239°
Theory: C, 79.63; H, 7.93; N, 5.81
Found: C, 76.69; H, 8.08; N, 5.92

EXAMPLE 35

$C_{15}H_{17}NO_2$; *4-methoxy-7,8,9,10-tetrahydro-6H-cyclohepta-(b)-quinoline-11-one*

M.P.: 282°–284°
Theory: C, 74.05; H, 7.04; N, 76
Found: C, 73.94; H, 7.02; N, 5.96

EXAMPLE 36

$C_{15}H_{17}NO$; *4-methyl-7,8,9,10-tetrahydro-6H-cyclohepta-(b)-quinoline-11-one*

M.P.: 337°–338°
Theory: C, 79.26; H, 7.54; N, 6.16
Found: C, 79.61; H, 7.35; N, 6.26

EXAMPLE 37

$C_{14}H_{14}ClNO$; *4-chloro-7,8,9,10-tetrahydro-6H-cyclohepta-(b)-quinoline-11-one*

M.P.: 264°–265°
Theory: C, 67.87; H, 5.70; Cl, 14.32
Found: C, 68.06; H, 5.79; Cl, 14.63

EXAMPLE 38

$C_{15}H_{17}NO_2$; *2-methoxy-7,8,9,10-tetrahydro-6H-cyclohepta-(b)-quinoline-11-one*

M.P.: 360°
Theory: C, 74.04; H, 7.04; N, 5.76
Found: C, 73.85; H, 6.98; N. 5.96

EXAMPLE 39

$C_{14}H_{14}ClNO$; *2-chloro-7,8,9,10-tetrahydro-6H-cyclohepta-(b)-quinoline-11-one*

M.P.: 360°
Theory: C, 67.88; H, 5.70; Cl, 32
Found: C, 67.94; H, 5.85; Cl, 14.16

EXAMPLE 40

$C_{15}H_{17}NO$; *2-methyl-7,8,9,10-tetrahydro-6H-cyclohepta-(b)-quinoline-11-one*

M.P.: 360°
Theory: C, 79.26; H, 7.54; N, 6.16
Found: C, 79.16; H, 7.17; N, 6.41

EXAMPLE 41

$C_{16}H_{18}ClN$; *11-chloro-4-ethyl-7,8,9,10-tetrahydro-6H-cyclohepta-(b)-quinoline*

M.P.: 69°–72°
Theory: C, 73.98; H, 6.98; Cl, 13.65
Found: C, 73.69; H, 6.82; Cl, 13.70

EXAMPLE 42

$C_{16}H_{18}ClN$; *11-chloro-1,4-dimethyl-7,8,9,10-tetrahydro-6H-cyclohepta-(b)-quinoline*

M.P.: 88°–90°
Theory: C, 73.98; H, 6.98; Cl, 13.65
Found: C, 74.31; H, 6.01; Cl, 13.82

EXAMPLE 43

$C_{14}H_{13}Cl_2N$; *4,11-dichloro-7,8,9,10-tetrahydro-6H-cyclohepta-(b)-quinoline*

M.P.: 81°–83°
Theory: C, 63.03; H, 4.91; Cl, 26.81
Found: C, 63.08; H, 5.09; Cl, 26.78

EXAMPLE 44

$C_{15}H_{16}ClNO$; *11-chloro-4-methoxy-7,8,9,10-tetrahydro-6H-cyclohepta-(b)-quinoline*

M.P.: 133°–134°
Theory: C, 68.83; H, 6.16; Cl, 13.54
Found: C, 68.21; H, 5.96; Cl, 13.37

EXAMPLE 45

$C_{15}H_{16}ClN$; *11-chloro-4-methyl-7,8,9,10-tetrahydro-6H-cyclohepta-(b)-quinoline*

M.P.: 85°–86°
Theory: C, 73.31; H, 6.56; Cl, 14.43
Found: C, 72.59; H, 6.67; Cl, 14.54

EXAMPLE 46

$C_{14}H_{13}Cl_2N$; *2,11-dichloro-7,8,9,10-tetrahydro-6H-cyclohepta-(b)-quinoline*

M.P.: 109°–111°
Theory: C, 63.16; H, 4.92; Cl, 26.65
Found: C, 62.85; H, 4.84; Cl, 26.37

EXAMPLE 47

$C_{15}H_{16}ClNO$; *11-chloro-2-methoxy-7,8,9,10-tetrahydro-6H-cyclohepta-(b)-quinoline*

M.P.: 110°–113°
Theory: C, 68.83; H, 6.16; Cl, 13.54
Found: C, 69.57; H, 6.11; Cl, 13.08

EXAMPLE 48

$C_{15}H_{16}ClN$; *11-chloro-2-methyl-7,8,9,10-tetrahydro-6H-cyclohepta-(b)-quinoline*

M.P.: 79°–80°
Theory: C, 73.31; H, 6.56; Cl, 14.43; N, 5.70
Found: C, 72.76; H, 6.77; Cl, 14.40; N. 5.95

EXAMPLE 49

$C_{14}H_{14}ClN$; *11-chloro-7,8,9,10-tetrahydro-6H-cyclohepta-(b)-quinoline*

M.P.: 96°–98°
Theory: C, 72.56; H, 6.09; Cl, 15.31; N, 6.05
Found: C, 72.84; H, 5.95; Cl, 15.41; N, 5.93

EXAMPLE 50

$C_{21}H_{20}ClNO$; *11-(p-cresoxy)-2-chloro-7,8,9,10-tetrahydro-6H-cyclohepta-(b)-quinoline*

M.P.: 110°–112°
Theory: C, 74.66; H, 5.97; N, 4.15
Found: C, 75.27; H, 5.93; N, 3.86

EXAMPLE 51

$C_{22}H_{23}NO_2 \cdot HCl$; *the hydrochloride of 2-methoxy-11-(p-cresoxy) 7,8,9,10 - tetrahydro - 6H - cyclohepta-(b)-quinoline*

M.P.: 180°–184°
Theory: C, 71.43; H, 6.49; N, 3.79
Found: C, 72.35; H, 6.10; N, 3.43

EXAMPLE 52

$C_{14}H_{16}N_2$; *11-amino-7,8,9,10-tetrahydro-6H-cyclohepta-(b)-quinoline*

M.P.: 176°–177°
Theory: C, 79.20; H, 7.60; N, 13.20
Found: C, 79.10; H, 7.59; N, 13.31

EXAMPLE 53

$C_{15}H_{18}N_2O$; *11 - amino-2-methyl-7,8,9,10-tetrahydro-6H-cyclohepta-(b)-quinoline*

M.P.: 200°–202°
Theory: C, 79.60; H, 8.02; N, 12.83
Found: C, 79.18; H, 8.82; N, 12.98

EXAMPLE 54

$C_{15}H_{18}N_2O$; *11-amino-2-methoxy-7,8,9,10-tetrahydro-6H-cyclohepta-(b)-quinoline*

M.P.: 178°–179°
Theory: C, 74.35; H, 7.49; N, 11.56
Found: C, 73.90; H, 7.29; N, 11.06

EXAMPLE 55

$C_{15}H_{18}N_2$; *11-amino-4-methyl-7,8,9,10-tetrahydro-6H-cyclohepta-(b)-quinoline*

M.P.: 136°–138°
Theory: C, 79.59; H, 8.01; N, 12.38
Found: C, 80.18; H, 7.47; N, 12.58

EXAMPLE 56

$C_{15}H_{18}N_2O$; *11-amino-4-methoxy-7,8,9,10-tetrahydro-6H-cyclohepta-(b)-quinoline*

M.P.: 150°–152°
Theory: C, 74.35; H, 7.49; N, 11.56
Found: C, 75.19; H, 6.83; N, 11.66

EXAMPLE 57

$C_{14}H_{15}ClN_2$; *11-amino-4-chloro-7,8,9,10-tetrahydro-6H-cyclohepta-(b)-quinoline*

M.P.: 168°–170°
Theory: C, 68.15; H, 6.13; Cl, 14.37
Found: C, 67.67; H, 6.37; Cl, 14.24

EXAMPLE 58

$C_{16}H_{20}N_2$; *11-amino-4-ethyl-7,8,9,10-tetrahydro-6H-cyclohepta-(b)-quinoline*

M.P.: 78°–80°
Theory: C, 79.96; N, 11.66
Found: C, 80.06; H, 8.37; N, 11.85

Without further analysis, the foregoing will so fully reveal the gist of the present invention that others can by applying current knowledge readily adapt it for various aplications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of compounds of the formula:

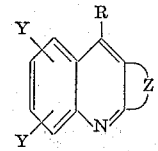

wherein R is selected from the group consisting of hydroxyl, amino, chlorine, =O and lower alkyl substituted phenoxy, wherein Y is selected from the group consisting of hydrogen, lower alkyl, chloro and methoxy, and wherein Z together with the two carbon atoms to which it is attached is cycloheptane, and non-toxic acid addition salts thereof.

2. A compound of the formula:

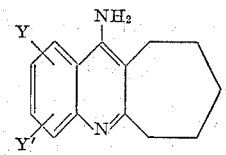

wherein Y is methoxy and Y' is hydrogen.

3. A compound of the formula:

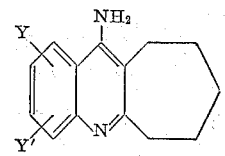

wherein Y is lower alkyl and Y' is hydrogen.

4. A compound of the formula:

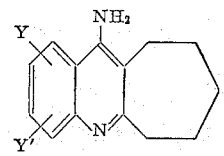

wherein Y is chlorine and Y' is hydrogen.

5. A compound of the formula:

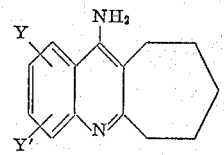

wherein Y is chlorine and Y' is lower alkyl.

6. A compound of the formula:

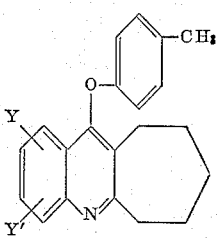

wherein Y is methoxy and Y' is hydrogen.

7. A compound of the formula:

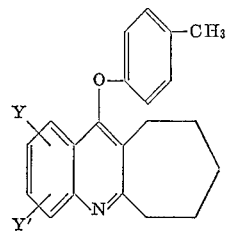

wherein Y is lower alkyl and Y' is hydrogen.

8. A compound of the formula:

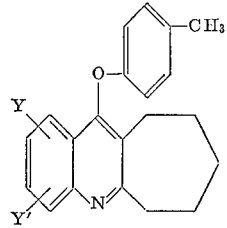

wherein Y is chlorine and Y' is hydrogen.

9. A compound of the formula:

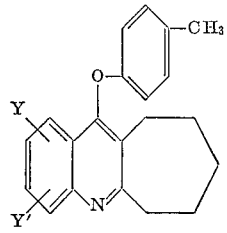

wherein Y is chlorine and Y' is lower alkyl.

10. A compound selected from the group consisting of:

5-methoxy-7,8,9,10-tetrahydro-6H-cyclohepta-(6)-quinoline-11-one;
11-chloro-4-methoxy-7,8,9,10-tetrahydro-6H-cyclohepta-(b)-quinoline;
2-methoxy-11-(4'-methylphenoxy)-7,8,9,10-tetrahydro-6H-cyclohepta-(b)-quinoline;
2-methoxy-11-amino-7,8,9,10-tetrahydro-6H-cyclohepta-(b)-quinoline;
11-amino-2-methyl-7,8,9,10-tetrahydro-6H-cyclohepta-(b)-quinoline;
3-chloro-7,8,9,10-tetrahydro-6H-cyclohepta-(b)-quinoline-11-one;
1,4-dimethyl-7,8,9,10-tetrahydro-6H-cyclohepta-(b)-quinoline-11-one;
4-methoxy-7,8,9,10-tetrahydro-6H-cyclohepta-(b)-quinoline-11-one;
4-methyl-7,8,9,10-tetrahydro-6H-cyclohepta-(b)-quinoline-11-one;
4-chloro-7,8,9,10-tetrahydro-6H-cyclohepta-(b)-quinoline-11-one;
2-methoxy-7,8,9,10-tetrahydro-6H-cyclopheta-(b)-quinoline-11-one;
2-chloro-7,8,9,10-tetrahydro-6H-cyclohepta-(b)-quinoline-11-one;
2-methyl-7,8,9,10-tetrahydro-6H-cyclohepta-(b)-quinoline-11-one;
11-chloro-4-ethyl-7,8,9,10-tetrahydro-6H-cyclohepta-(b)-quinoline;
11-chloro-1,4-dimethyl-7,8,9,10-tetrahydro-6H-cyclohepta-(b)-quinoline;
4,11-dichloro-7,8,9,10-tetrahydro-6H-tetrahydro-6H-cyclohepta-(b)-quinoline;
11-chloro-4-methoxy-7,8,9,10-tetrahydro-6H-cyclohepta-(b)-quinoline;
11-chloro-4-methyl-7,8,9,10-tetrahydro-6H-cyclohepta-(b)-quinoline;
2,11-dichloro-7,8,9,10-tetrahydro-6H-tetrahydro-6H-cyclohepta-(b)-quinoline;
11-chloro-2-methoxy-7,8,9,10-tetrahydro-6H-cyclohepta-(b)-quinoline;
11-chloro-2-methyl-7,8,9,10-tetrahydro-6H-cyclohepta-(b)-quinoline;
11-chloro-7,8,9,10-tetrahydro-6H-cyclohepta-(b)-quinoline;
11-(p-cresoxy)-2-chloro-7,8,9,10-tetrahydro-6H-cyclohepta-(b)-quinoline;

the hydrochloride of 2-methoxy-11-(p-cresoxy)7,8,9,10-tetrahydro-6H-cyclohepta-(b)-quinoline;
11-amino-7,8,9,10-tetrahydro-6H-cyclohepta-(b)-quinoline;
11-amino-2-methyl-7,8,9,10-tetrahydro-6H-cyclohepta-(b)-quinoline;
11-amino-2-methoxy-7,8,9,10-tetrahydro-6H-cyclohepta-(b)-quinoline;
11-amino-4-methyl-7,8,9,10-tetrahydro-6H-cyclohepta-(b)-quinoline;
11-amino-4-methoxy-7,8,9,10-tetrahydro-6H-cyclohepta-(b)-quinoline;
11-amino-4-chloro-7,8,9,10-tetrahydro-6H-cyclohepta-(b)-quinoline; and
11-amino-4-ethyl-7,8,9,10-tetrahydro-6H-cyclohepta-(b)-quinoline.

References Cited by the Examiner
UNITED STATES PATENTS

| | | | |
|---|---|---|---|
| 1,867,863 | 7/1932 | Muth | 260—243 |
| 2,653,940 | 9/1953 | Johnson | 260—288 |
| 2,892,753 | 6/1959 | Schmidt et al. | 167—65 |
| 3,033,866 | 5/1962 | Saggiomo et al. | 260—279 |
| 3,047,461 | 7/1962 | Hardy et al. | 167—65 |
| 3,122,553 | 2/1964 | Seneca | 260—279 |

OTHER REFERENCES

Albert: "The Acridines," Arnold, 1951, pp. 1, 111, 115, 172, 173, 208 particularly relied upon.

Desai et al.: J. Indian Chem. Soc., vol. 37, pp. 553–6 (1960).

Ettel et al.: Chem. Abs., vol. 52, cols. 4642–3 (1958).

Magidson et al.: Chem. Abstracts, vol. 31, cols. 5800–1 (1937).

Sargent et al.: J. Org. Chem., vol. 11, pages 359–62 (1946).

Sargent et al.: J. Org. Chem., vol. 12, pages 567–76 (1947).

Stephens et al.: J. Chem. Soc., 1947, pages 1034–9.

NICHOLAS S. RIZZO, *Primary Examiner.*

IRVING MARCUS, *Examiner.*

DON M. KERR, DONALD G. DAUS,
*Assistant Examiners.*